US009002422B2

(12) United States Patent
Merz et al.

(10) Patent No.: US 9,002,422 B2
(45) Date of Patent: *Apr. 7, 2015

(54) ENGAGEMENT FEATURES AND ADJUSTMENT STRUCTURES FOR ELECTRONIC DEVICES WITH INTEGRAL ANTENNAS

(71) Applicant: Apple Inc., Cupertino, CA (US)

(72) Inventors: Nicholas G. L. Merz, San Francisco, CA (US); Dean F. Darnell, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/287,747

(22) Filed: May 27, 2014

(65) Prior Publication Data

US 2014/0266926 A1    Sep. 18, 2014

Related U.S. Application Data

(63) Continuation of application No. 13/018,263, filed on Jan. 31, 2011, now Pat. No. 8,750,949.

(60) Provisional application No. 61/431,523, filed on Jan. 11, 2011.

(51) Int. Cl.
*H01Q 1/24*    (2006.01)
*H04B 1/38*    (2006.01)
(Continued)

(52) U.S. Cl.
CPC ............... *H01Q 1/243* (2013.01); *H04B 1/38* (2013.01); *H01Q 9/0421* (2013.01); *H01Q 13/10* (2013.01)

(58) Field of Classification Search
USPC .......... 455/550.1, 575.1, 575.5, 575.6, 575.7, 455/90.1, 90.3, 351; 343/700 MS, 702
See application file for complete search history.

(56) References Cited

U.S. PATENT DOCUMENTS 6,675,461 B1    1/2004  Rowson et al.
6,853,338 B2    2/2005  McConnell
(Continued)

FOREIGN PATENT DOCUMENTS

EP    1632424    8/2006
EP    2109185    10/2009

OTHER PUBLICATIONS

Strasser F et al., "Stanzteile zum Einbetten in Kunststoffieile", Kunstoffe International, Carl Hanser Verlag, Munchen, Feb. 1, 1988, vol. 78, No. 2, pp. 151-153.

*Primary Examiner* — Thanh Le
(74) *Attorney, Agent, or Firm* — Treyz Law Group; G. Victor Treyz

(57) ABSTRACT

Electronic devices may be provided that contain wireless communications circuitry. The wireless communications circuitry may include antenna structures that are formed from an internal ground plane and a peripheral conductive housing member. The internal ground plane and peripheral conductive housing member may be separated by a gap. The internal ground plane may be formed from sheet metal structures having engagement features such as tabs bent upwards at an angle. Plastic structures may be insert molded over the engagement features. When the internal ground plane is mounted in the electronic device, the plastic structures may bridge the gap between the internal ground plane and the peripheral conductive housing member. An adjustable structure such as a washer with a selectable thickness may be mounted to the peripheral conductive housing member opposing conductive structures across the gap. The thickness ma be adjusted to adjust antenna performance.

20 Claims, 9 Drawing Sheets

(51) Int. Cl.
 *H01Q 9/04* (2006.01)
 *H01Q 13/10* (2006.01)

(56) References Cited

U.S. PATENT DOCUMENTS

| | | | |
|---|---|---|---|
| 6,922,574 B2 * | 7/2005 | Abbasi et al. | 455/575.5 |
| 7,231,237 B2 * | 6/2007 | Kinezos et al. | 455/575.7 |
| 7,612,725 B2 | 11/2009 | Hill et al. | |
| 7,764,236 B2 | 7/2010 | Hill et al. | |
| 8,126,410 B2 | 2/2012 | Alon et al. | |
| 2004/0201527 A1 | 10/2004 | Hani et al. | |
| 2008/0316115 A1 | 12/2008 | Hill et al. | |
| 2008/0316121 A1 | 12/2008 | Hobson et al. | |
| 2010/0097275 A1 | 4/2010 | Parsche et al. | |
| 2011/0006953 A1 | 1/2011 | Chiang et al. | |

* cited by examiner

ENGAGEMENT FEATURES AND ADJUSTMENT STRUCTURES FOR ELECTRONIC DEVICES WITH INTEGRAL ANTENNAS

This application is a continuation of patent application Ser. No. 13/018,263, filed Jan. 31, 2011, which claims the benefit of provisional patent application No. 61/431,523, filed Jan. 11, 2011, each of which is hereby incorporated by referenced herein in its entirety. This application claims the benefit of and claims priority to patent application Ser. No. 13/018,263, filed Jan. 31, 2011 and provisional patent application No. 61/431,523, filed Jan. 11, 2011.

BACKGROUND

This relates generally to electronic devices, and more particularly, to housing structures and adjustable antenna structures for electronic devices.

Electronic devices such as cellular telephones and other devices often contain wireless communications circuitry. The wireless communications circuitry may include, for example, cellular telephone transceiver circuits for communicating with cellular telephone networks. Wireless communications circuitry in an electronic device may also include wireless local area network circuits and other wireless circuits. Antenna structures are used in transmitting and receiving wireless signals.

To satisfy consumer demand for small form factor wireless devices, manufacturers are continually striving to implement wireless communications circuitry such as antennas using compact arrangements. At the same time, it may be desirable to include conductive structures in an electronic device such as metal device housing components. Because conductive components can affect radio-frequency performance, care must be taken when incorporating antennas into an electronic device that includes conductive structures. In some arrangements, it may be desirable to use conductive housing structures in forming antenna structures for a device. Such antenna structures may be sensitive to the layout of conductive housing structures. Locating the conductive housing structures and associated components within an electronic device without adversely impacting antenna performance can therefore pose challenges.

It would therefore be desirable to be able to provide improved arrangements for adjusting and mounting structures within an electronic device that are associated with antenna performance.

SUMMARY

Electronic devices may be provided that contain wireless communications circuitry. The wireless communications circuitry may include antenna structures that are formed from a around plane and a peripheral conductive housing member. The ground plane and peripheral conductive housing member may be separated by a gap. The gap may be filled with dielectrics such as air and plastic. Conductive components along the edges of the gap may influence the layout of the gap and thereby influence antenna performance.

The ground plane may be formed from sheet metal structures having protruding engagement features such as tabs bent upwards at an angle. Plastic structures may be insert molded over the engagement features. The tabs may be bent at a 45° angle and may be provided with dovetailed profiles to resist separation between the plastic structures and the sheet metal structures. When the around plane is mounted in the electronic device, the plastic structures may bridge the dielectric gap between the internal ground plane and the peripheral conductive housing member.

An adjustable structure such as a washer or other member with a selectable thickness may be mounted to the peripheral conductive housing member across the gap from conductive structures such as camera structures that are associated with the ground plane. If tests during manufacturing reveal that antenna performance is deviating from desired criteria, the thickness of the adjustable structure may be adjusted to tune antenna performance.

Further features of the invention, its nature and various advantages will be more apparent from the accompanying drawings and the following detailed description of the preferred embodiments.

DETAILED DESCRIPTION

Electronic devices may be provided with Wireless communications circuitry. The wireless communications circuitry may be used to support wireless communications in one or more wireless communications bands. Antenna structures in an electronic device may be used in transmitting and receiving radio-frequency signals.

Figure 1:
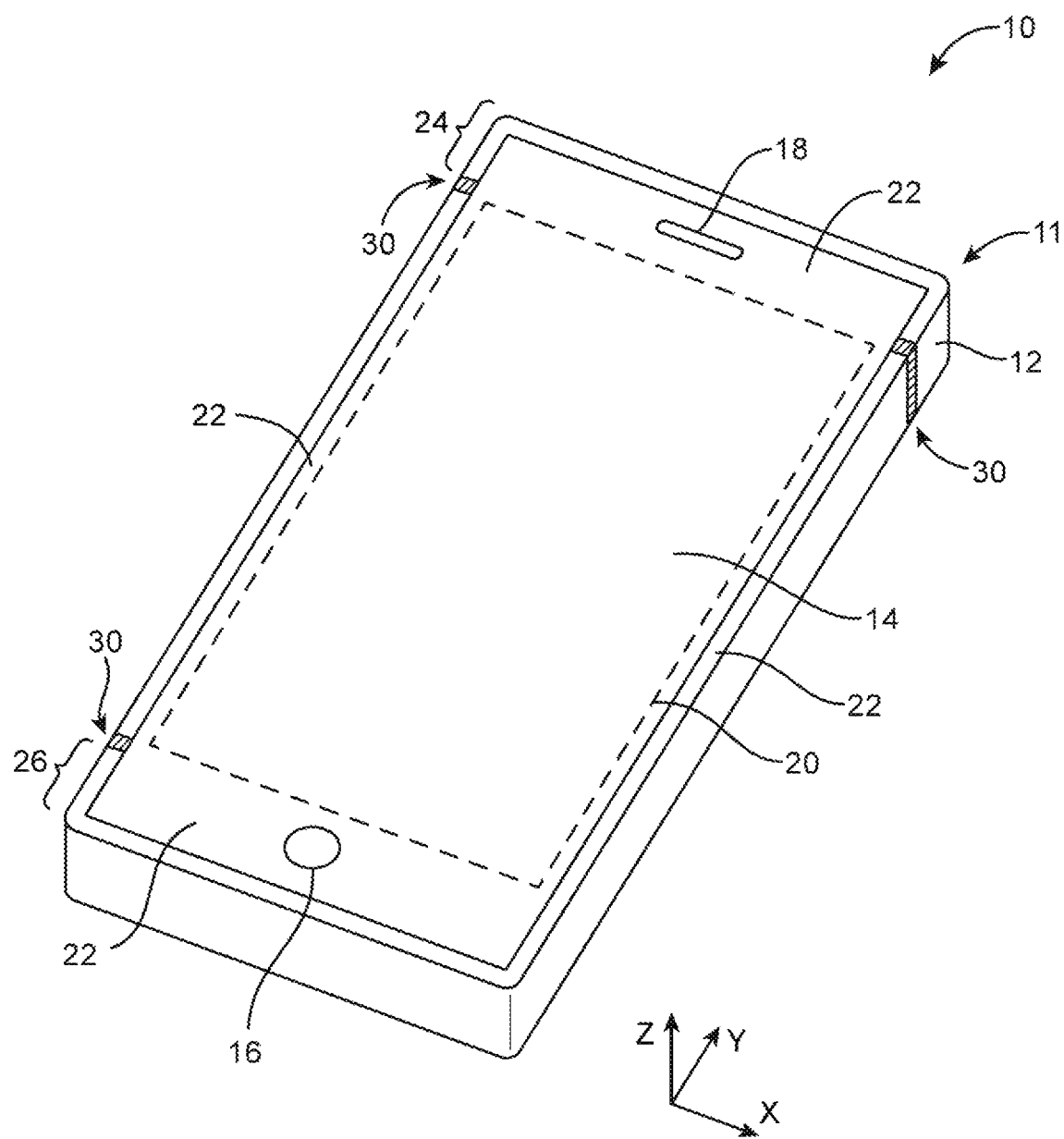
FIG. 1 is a perspective view of an illustrative electronic device of the type that may be provided with antenna structures that are formed using housing structures in accordance with an embodiment of the present invention.

An illustrative electronic device that contains wireless communications circuitry is shown in FIG. 1. Device 10 of FIG. 1 may be a notebook computer, a tablet computer, a computer monitor with an integrated computer, a desktop computer, or other electronic equipment. If desired, electronic device 10 may be a portable device such as a cellular telephone, a media player, other handheld devices, a wristwatch device, a pendant device, an earpiece device, or other compact portable device.

As shown in FIG. 1, device 10 may have a housing such as housing 11. Housing 11 may be formed from materials such as plastic, metal, carbon fiber and other fiber composites, ceramic, glass wood, other materials, or combinations of these materials. Device 10 may be formed using a unibody construction in which some or all of housing 11 is formed from a single piece of material (e.g., a single cast or machined piece of metal, a single piece of molded plastic. etc.) or may be formed from frame structures, housing sidewall structures, and other structures that are assembled together using fasteners, adhesive, and other attachment mechanisms. In the illustrative arrangement shown in FIG. 1, housing 11 includes conductive peripheral housing member 12. Conductive peripheral housing member 12 may have a ring shape that runs around the rectangular periphery of device 10. One or more gaps such as gaps 30 may be formed in conductive peripheral housing member 12. Gaps such as gaps 30 may be filled with dielectric such as plastic and may interrupt the otherwise continuous shape of conductive peripheral housing member. Conductive peripheral housing member may have any suitable number of gaps 30 (e.g., more than one, more than two, three or more, less than three, etc.)

Conductive peripheral housing member 12 may be formed from a durable material such as metal. Stainless steel may be used for forming housing member 12 because stainless steel is aesthetically appealing, strong, and can be machined during manufacturing. Other metals may be used if desired. The rear face of housing 11 may be formed from plastic, glass, metal, ceramic composites, or other suitable materials. For example, the rear face of housing 11 may be formed form a plate of glass having regions that are backed by a layer of internal metal for added strength. Conductive peripheral housing member 12 may be relatively short in vertical dimension Z (e.g., to serve as a bezel for display 14) or may be taller (e.g., to serve as the sidewalk of housing 11 as shown in the illustrative arrangement of FIG. 1).

Device 10 may include components such as buttons, input-output port connectors, ports for removable media, sensors, microphones, speakers, status indicators, and other device components. As shown in FIG. 1, for example, deice 10 may include buttons such as menu button 16. Device 10 may also include a speaker port such as speaker port 18 (e.g., to serve as an ear speaker for device 10).

One or more antennas may be formed in device 10. The antennas may, for example, be formed in locations such as locations 24 and 26 to provide separation from the conductive elements of display 14. Antennas may be formed using single hand and multiband antenna structures. Examples of communications bands that may be covered by the antennas include cellular telephone bands (e.g., the bands at 850 MHz, 900 MHz, 1800 MHz, 1900 MHz, and 2100 MHz), satellite navigation bands (e.g., the Global Positioning System band at 1575 MHz), wireless local area network bands such as the IEEE 802.11 (WiFi®) bands at 2.4 GHz and 5 GHz, the Bluetooth band at 2.4 GHz, etc. Examples of antenna configurations that may be used for the antennas in device 10 include monopole antennas, dipole antennas, strip antennas, patch antennas, inverted-F antennas, coil antennas, planar inverted-F antennas, open slot antennas, closed slot antennas, loop antennas, hybrid antennas that include antenna structures of multiple types, or other suitable antenna structures.

Device 10 may include one or more displays such as display 14, Display 14 may be a liquid crystal display (LCD), an organic light-emitting diode (OLED) display, to plasma display, an electronic ink display, etc. A touch sensor may be incorporated into display 14 (i.e., display 14 may be a touch screen). The touch sensor may be an acoustic touch sensor. a resistive touch sensor, a piezoelectric touch sensor, a capacitive touch sensor (e.g., a touch sensor based on an array of indium tin oxide capacitor electrodes), or a touch sensor based on other touch technologies.

Display 14 may be covered h a transparent planar conductive member such as a layer of glass or plastic, The cover layer for display 14, which is sometimes referred to as a cover glass layer or cover glass, may extend over substantially all of the front face of device 10, as shown in FIG. 1. The rectangular center portion of the cover glass (surrounded by dashed line 20 in FIG. 1) contains an array of image pixels and is sometimes referred to as the active portion of the display. The peripheral outer portion of the cover glass (i.e., rectangular peripheral ring 22 of FIG. 1) does not contain any active image pixels and is sometimes referred to as the inactive portion of display 14. A patterned opaque masking layer such as a peripheral ring of black ink may be formed under inactive portion 22 to hide interior device components front view by a user.

Figure 2:
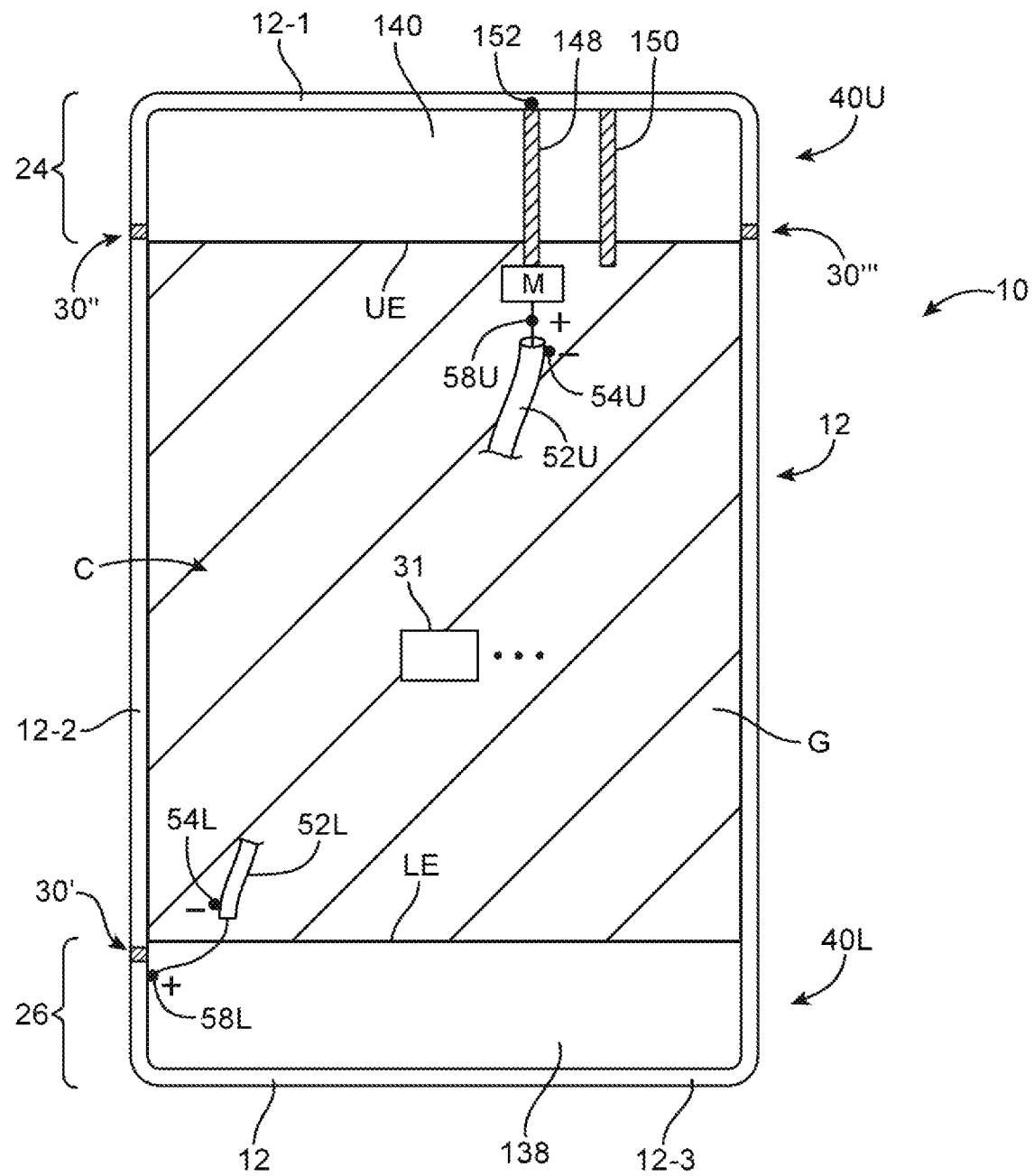
FIG. 2 is a top interior view of an electronic device of the type shown in FIG. 1 in accordance with an embodiment of the present invention.

FIG. 2 is a top view of the interior of device 10 showing how antennas 40L and 40U may be implemented within housing 12. As shown in FIG. 2, around plane G may be formed within housing 12. Ground plane G may form antenna ground fir antennas 40L and 40U. Because ground plane G may serve as antenna ground, ground plane G may sometimes be referred to as antenna ground, ground or a ground plane element (as examples). One or more printed circuit boards or other mounting structures may be used to mount components 31 in device 10. Components 31 may include radio-frequency transceiver circuits that are coupled to antennas 40U and 40L using transmission lines 52L and 52U, processors, application-specific integrated circuits, cameras, sensors, switches, connectors, buttons, and other electronic device components.

In central portion C of device 10, ground plane G may be formed by conductive structures such as a conductive housing midplate member (sometimes referred to as an internal housing plate or planer internal housing structures). The structures of ground plane G may be connected between the left and right edges of member 12. Printed circuit boards with conductive ground traces (e.g., one or more printed circuit boards used to mount components 31) may form part of ground plane G.

The midplate member may have one or more individual sections (e.g., patterned sheet metal sections) that are welded together. Portions of the in midplate structures may be covered with insert-molded plastic (e.g., to provide structural support in portions of the interior of device where no conductive ground is desired, such dielectric-filled portions of antennas 40U and 40L in regions 24 and 26).

At ends 24 and 26 of device 10, the shape of ground plane G may be determined by the shapes and locations of conductive structures that are tied to ground. Ground plane G in the simplified layout of FIG. 2 has a straight upper edge UE and a straight lower edge LE. In actual devices, the upper and lower edges of ground plane G and the interior surface of conductive peripheral housing member 12 generally have more complex shapes determined by the shapes of individual conductive structures that are present in device 10. Examples of conductive structures that may overlap to form ground plane G and that may influence the shape of the inner surface of member 12 include housing structures (e.g., a conductive, housing midplate structure, which may have protruding portions), conductive components (e.g., switches, cameras, data connectors, printed circuits such as flex circuits and rigid printed circuit boards, radio-frequency shielding cans, buttons and conductive button mounting structures), and other conductive structures in device 10. In the illustrative layout of FIG. 2, the portions of device 10 that are conductive and tied to ground to form part of ground plane G are shaded and are contiguous with central portion C.

Openings such as openings 138 and 140 (sometimes referred to as gaps) may be formed between ground plane G and respective portions of peripheral conductive housing member 12. Openings 138 and 140 may be filled with air, plastic, and other dielectrics. Openings 138 and 140 may be associated with antenna structures 40U and 40L.

Lower antenna 40L may be formed by a loop antenna structure having a shape that is determined at least partly by the shape of the lower portions of ground plane G and conductive housing member 12. In the example of FIG. 2, opening 138 is depicted as being rectangular, but this is merely illustrative. In practice, the shape of opening 138 may be dictated by the placement of conductive structures in region 26 such as a microphone, flex circuit traces, a data port connector, buttons, a speaker, etc.

Lower antenna 40L may be fed using an antenna feed made up of positive antenna feed terminal 58L and ground antenna feed terminal 54L. Transmission line 52L may be coupled to the antenna feed for lower antenna 40L. Gap 30' may form a capacitance that helps configure the frequency response of antenna 40L. If desired, device 10 may have conductive housing portions, matching circuit elements and other structures and components that help match the impedance of transmission line 52L to antenna 40L.

Antenna 40U may be a two-branch inverted-F antenna. Transmission fine 52U may be used to feed antenna 40U at antenna feed terminals 58U and 54U. Conductive structures 150 may form a shorting path that bridges dielectric opening 140 and electrically shorts ground plane G to peripheral housing member 12. Conductive structure 148 (which may be formed using structures of the type used in forming structures 150 or other suitable structures) and matching circuit M may be used to connect antenna feed terminal 58U to peripheral conductive member 12 at point 152. Conductive structures such as structures 148 and 150 (which are sometimes referred to as conductive paths) may be formed by flex circuit traces, conductive housing structures, springs, screws, welded connections, solder joints, brackets, metal plates, or other conductive structures.

Gaps such as gaps 30', 30", and 30'" (e.g., gaps 30 of FIG. 1) may be present in peripheral conductive member 12. A phantom gap may be provided in the lower right-hand portion of device 10 for aesthetic symmetry if desired. The presence of gaps 30', 30", and 30'" may divide peripheral conductive housing member 12 into segments. As shown in FIG. 2, peripheral conductive member 12 may include first segment 12-1, second segment 12-2, and third segment 12-3.

Segment 12-1 may form antenna resonating element arms for antenna 40U. In particular, a first portion (segment) of segment 12-1 may extend from point 152 (where segment 12-1 is fed) to the end of segment 12-1 that is defined by gap 30 and a second portion (segment) of segment 12-1 may extend from point 152 to the opposing end of segment 12-1 that is defined by gap 30'". The first and second portions of segment 12-1 may form respective branches of an inverted F antenna and may be associated with respective low band (LB) and high band (HB) antenna resonances for antenna 40U. The relative positions of structures 148 and 150 along the length of member 12-1 may affect the response of antenna 40U and may be selected to tune antenna 40U. Antenna tuning adjustments may also be made by adjusting matching, circuit M, by adjusting the configuration of components used in forming paths 148 and 150, by adjusting the shapes of opening 140, etc. Antenna 401, may likewise be adjusted.

With one illustrative arrangement, antenna 40L may cover the transmit and receive sub-bands in five communications bands (e.g., 850 MHz, 900 MHz, 1,800 MHz, 1900 MHz, and 2100 MHz). Antenna 40U may, as an example, be configured to cover a subset of these five illustrative communications bands. For example, antenna 40U may be configured to cover a two receive bands of interest and, with tuning, four receive bands of interest.

Figure 3:
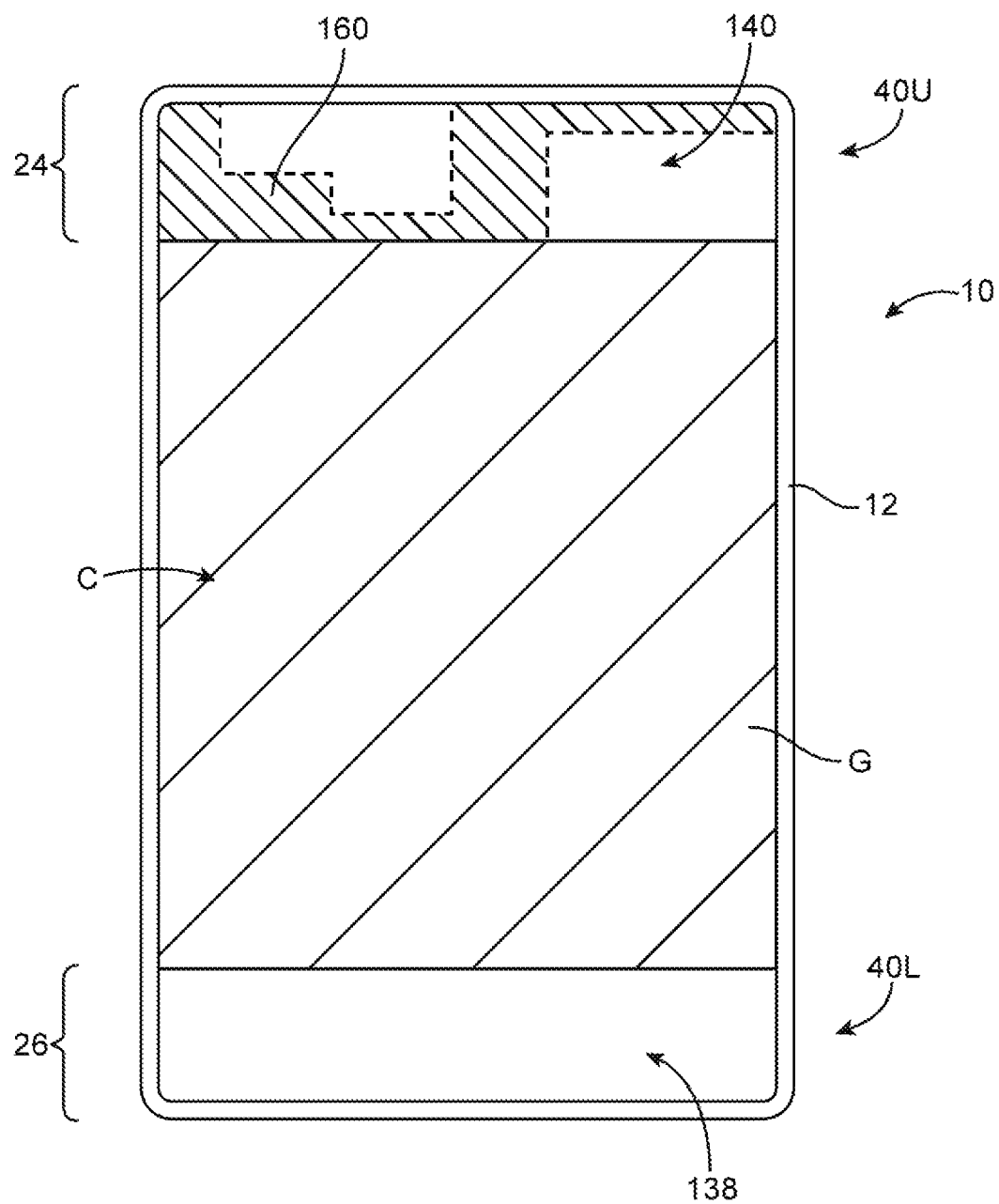
FIG. 3 is a diagram shove Where gaps between conductive electronic device housing structures may be formed to form antenna structures in accordance with an embodiment of the present invention.

Proper functioning of antennas 40L and 40U relies, at least partly, on the presence of gaps 138 and 140. The size and shape of gaps 138 and 140 is determined by the placement of housing structures such as peripheral conductive housing member 12 and the conductive structures of ground plane G and by conductive component structures that line the interior of gap G. To preserve the presence of gaps 138 and 140 While providing structural support for ground plane G in regions 24 and 26, it may be desirable to add dielectric support structures to the ends of ground plane G, such as dielectric structures 160. Structures 160 may, for example, be formed from injection-molded (insert-molded) plastic. Because structures 160 are formed from dielectric, the shape of opening 140 (in the FIG. 3 example) is not altered by the presence of structures 160. Structures 160 may, however, help to provide support for the upper end of ground plane G (e.g., by helping to attach edge UE to the interior portions of peripheral conductive housing member 12). With one suitable arrangement, the structures of ground plane CI may be formed from multiple sheet metal (e.g. stainless steel) sections that are attached to each other using welds and overmolded plastic. Structures 160 may be injection molded over the upper portions of ground plane G and may have portions that fit within one or more recesses in peripheral conductive housing member 12.

To ensure that the joint between structures 160 and the metal sheet structures of ground plane G is sufficiently robust, it may be desirable to form engagement features on the edge of ground plane G. These engagement features may take the form of bent metal protrusions (as an example).

Figure 4:
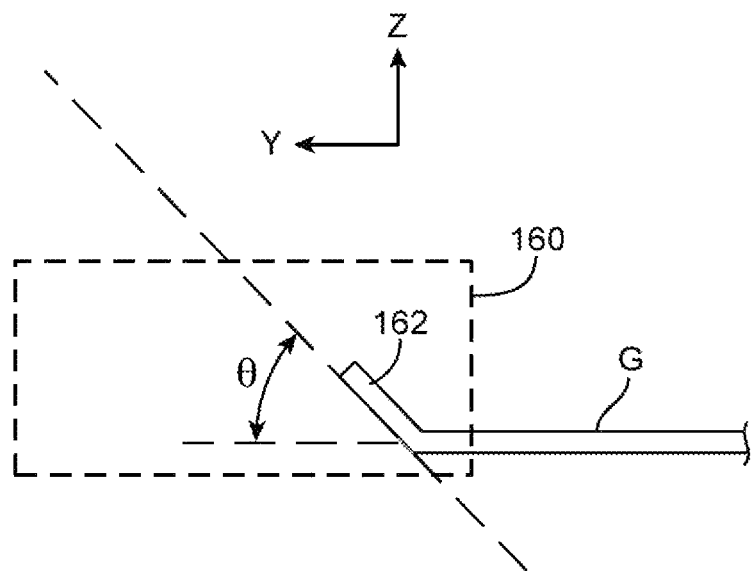
FIG. 4 is a side view of conductive internal housing structures such as ground plane structures showing how the ground plane structures may be provided, with engagement features that help in attaching a dielectric structure in accordance with an embodiment of the present invention.

Art illustrative arrangement in which ground plane G is provided with bent metal prongs that serve as engagement features for polymer structures 160 is shown in FIG. 4. As shown in the cross-sectional view of FIG. 4. engagement features 162 may be formed by bending patterned protruding portions of the edge aground plane G at an angle θ relative to the plane of ground plane G. The angle θ may be for example, about 45 (e.g., 20 to 60° or other suitable non-zero angle). With this type of configuration, engagement features 162 may resist detachment from ground plane G in both dimension Z (i.e., parallel to the surface normal to the plane of ground plane G) and dimension Y (parallel to the longitudinal axis of device 20 and ground plane G).

Figure 5:
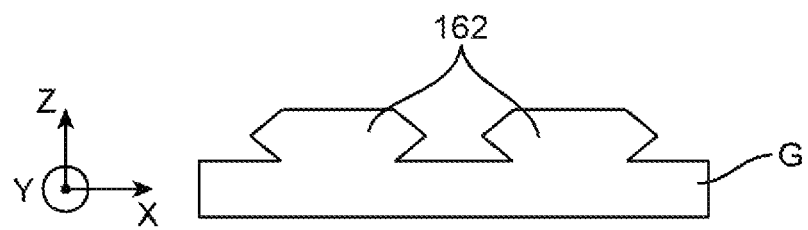
FIG. 5 is a diagram showing an illustrative dovetail shape that may be used for the engagement features of FIG. 4 in accordance with an embodiment of the present invention.

To help prevent structures 160 from pulling away from engagement structures 162, engagement structures 162 may be provided with a dovetail shape of the type shown in FIG. 5. Other shapes that help capture part of structures 160 and thereby resist removal of structures 160 from ground plane G may be used if desired. The illustrative profiles of the bent dovetail-shaped tabs that form engagement structures 162 of FIG. 5 are merely illustrative.

Figure 6:
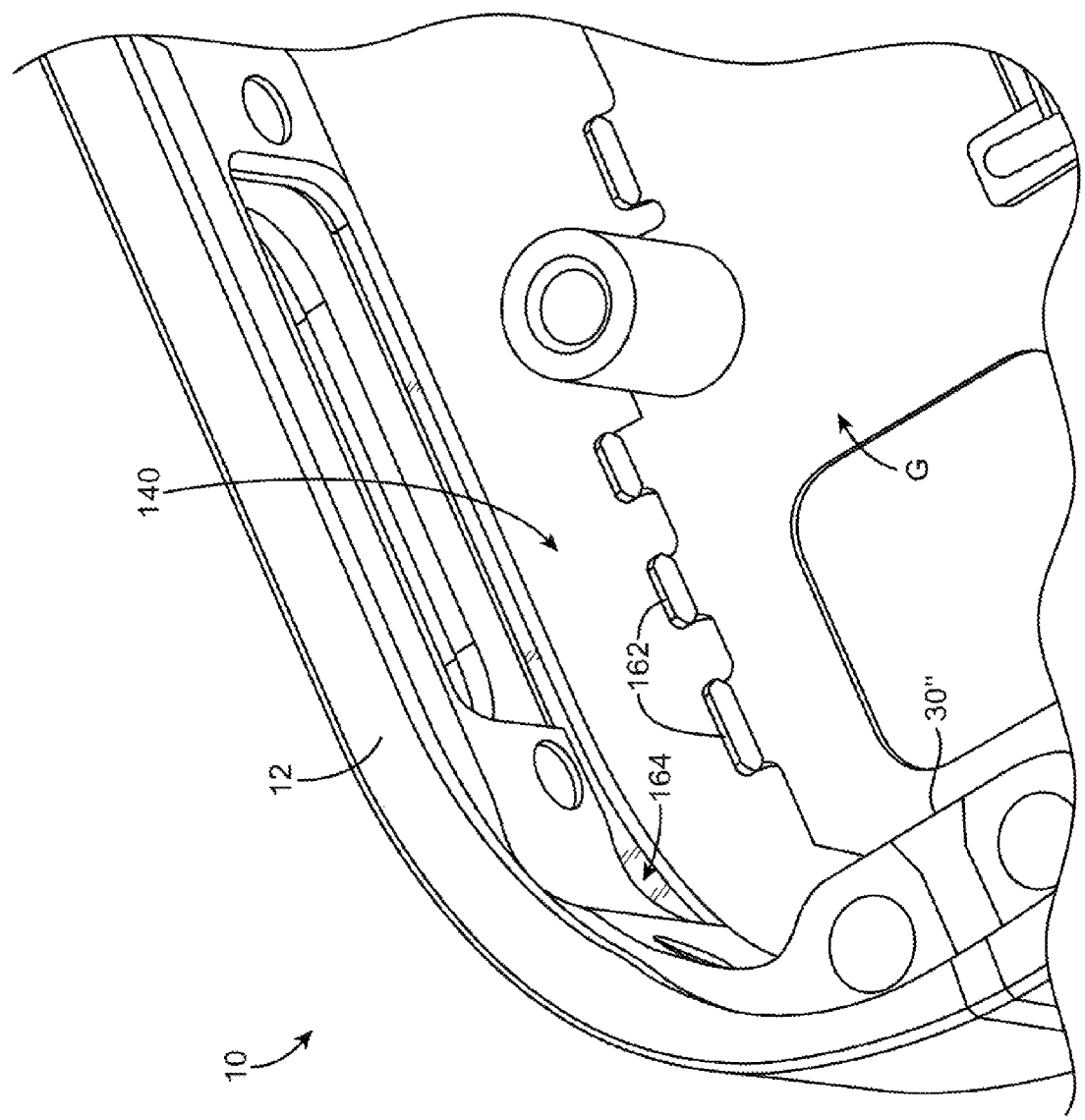
FIG. 6 is a perspective view of a portion of an electronic device including the features of FIG. 5 in accordance with an embodiment of the present invention.

FIG. 6 is a perspective view of an interior portion of device 10 in the vicinity of engagement structures 162 on ground plane G in which structures 160 have been omitted to allow engagement feature 162 to be viewed. As shown in FIG. 6, peripheral conductive housing member 12 may have portions such as recessed portion 164 that receive mating edge portions of member 160. This helps secure member 160 and therefore ground plane U within housing 11.

Figure 7:
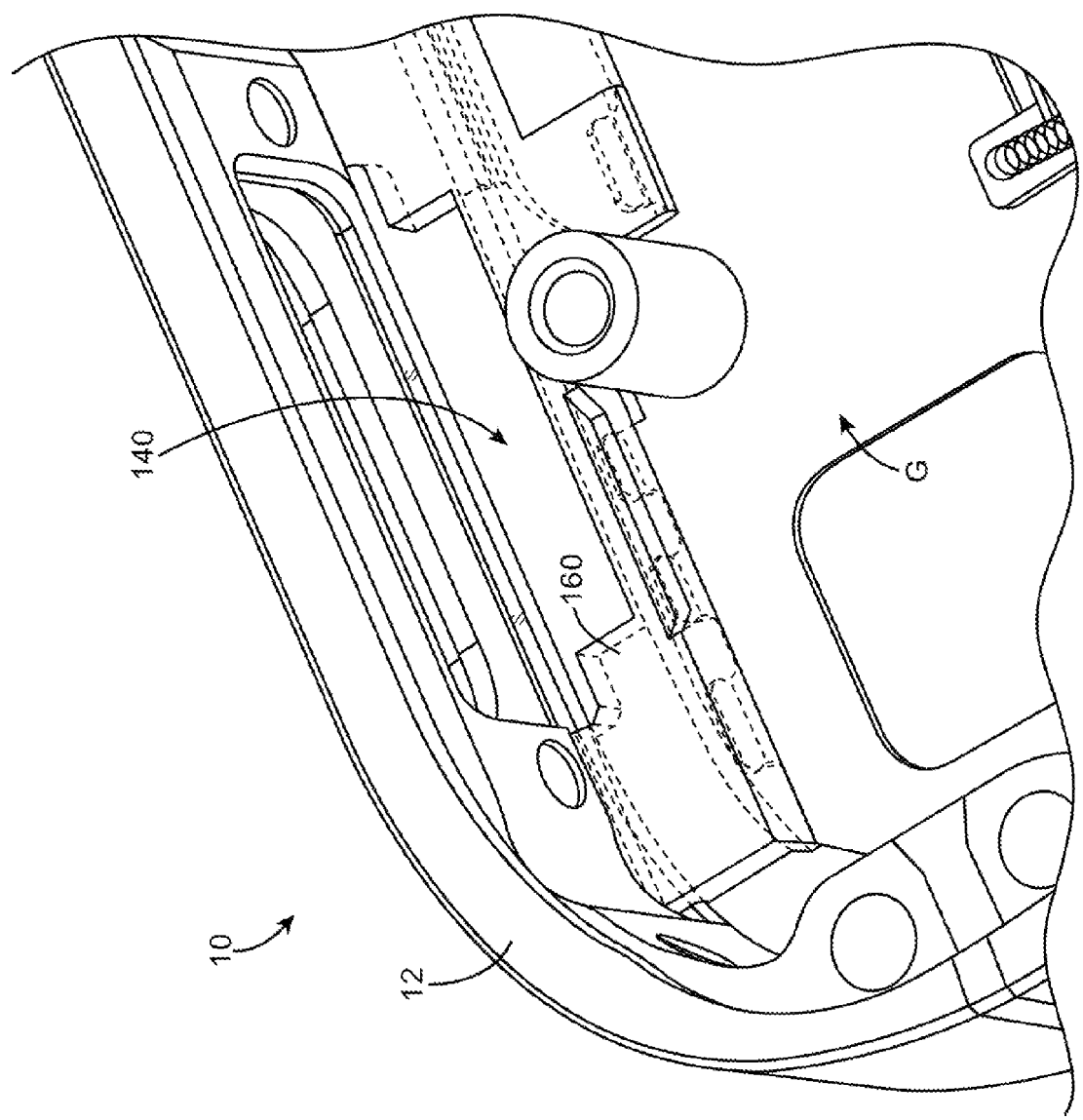
FIG. 7 is a perspective view of the portion the electronic device of FIG. 6 in which a dielectric structure such as an insert-molded plastic member has been attached to the engagement features on the ground plate structures in accordance with an embodiment of the present invention.

FIG. 7 is a perspective view of the interior portion of device 10 of FIG. 6 in which structures 160 have been included. As shown in FIG. 7, structures 160 provide a dielectric mechanical support that bridges gap 140 without imposing conductive structures within gap 140.

To ensure that antennas such as antenna 40U and 40L perform properly, it is sometimes desirable to provide adjustable components in device 10. If testing reveals that antenna performance should be altered, the configuration of the adjustable components can be changed during manufacturing to ensure that device 10 is manufactured according to design specifications.

Figure 8:
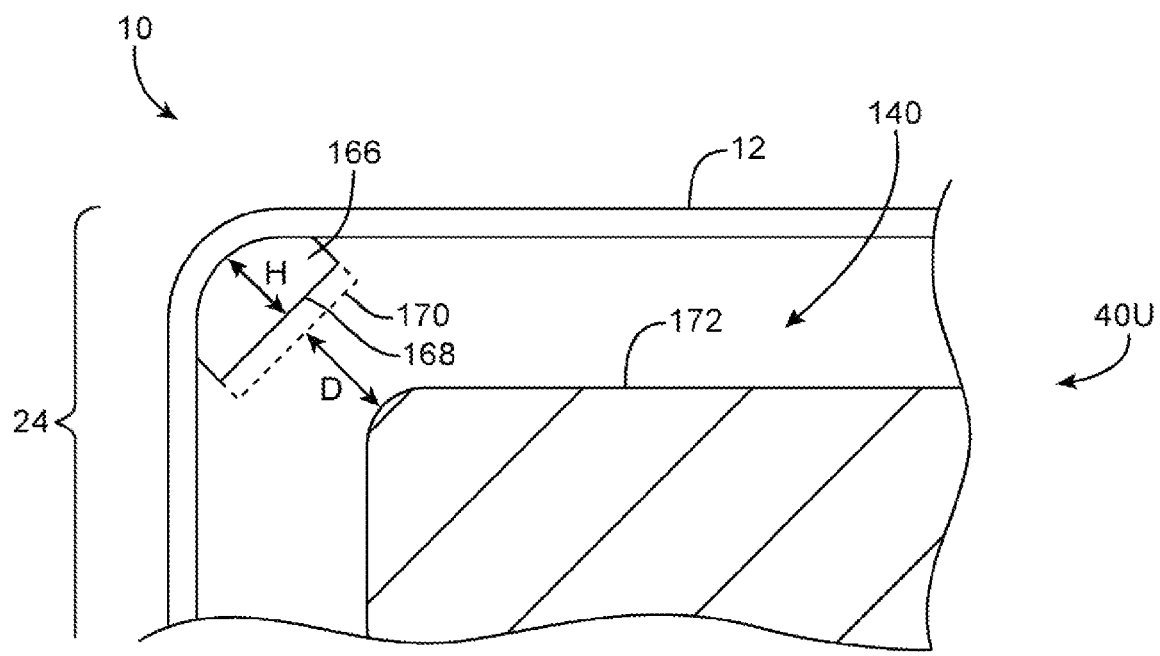
FIG. 8 is a top view of an interior corner portion of an electronic device in the vicinity of a gap region used as part of an antenna showing how the corner of the device may be provided with an adjustable conductive structure for making antenna adjustments in accordance with an embodiment of the present invention.

FIG. 8 is a top view of an illustrative antenna tuning structure of the type that may be used in device 10. In the example of FIG. 8, adjustable structure 166 has been formed in antenna 40U in region 24. This is merely illustrative. Any antenna structures may be provided with adjustable components such as adjustable structure 166 if desired. As shown in FIG. 8, the shape of opening 140 may be partly determined by the locations of components that include conductive portions such as component 172. Component 172 may be, for example, a camera module.

Adjustable structure 166 may be formed from conductive structures that influence the size and shape of opening 140. In some configurations, structure 166 has a relatively shallow height H, reaching surface 168. In other configurations, structure 166 has a large height H (e.g., so that the outermost surface of structure 166 is aligned with dashed line 170). The location of the surface of structure 166 influences the electrical performance of antenna 40L (e.g., by changing the shape of opening 140, by changing capacitances in antenna 40U such as the shunt capacitance between conductive peripheral housing member 12 and ground plane G that is influenced by the distance D between member 12 and component 172 in the vicinity of structure 166, etc.).

During manufacturing, the performance of antenna structures such as antenna 40U may be measured. If the performance of antenna 40U needs to be adjusted, corresponding adjustments to the value of height H may be made to adjustable structure 166. Once the performance of one or more sample devices has been characterized in this way, subsequent devices of the same configuration (e.g., devices that include peripheral conductive housing members, and ground plane structures (e.g., from common sources and that are manufactured using the same techniques), can be similarly adjusted. This type of adjustment may therefore be made to numerous devices on a production line, without needing to individually remanufacture components such as peripheral conductive housing member 12 or ground plane G.

Figure 9:
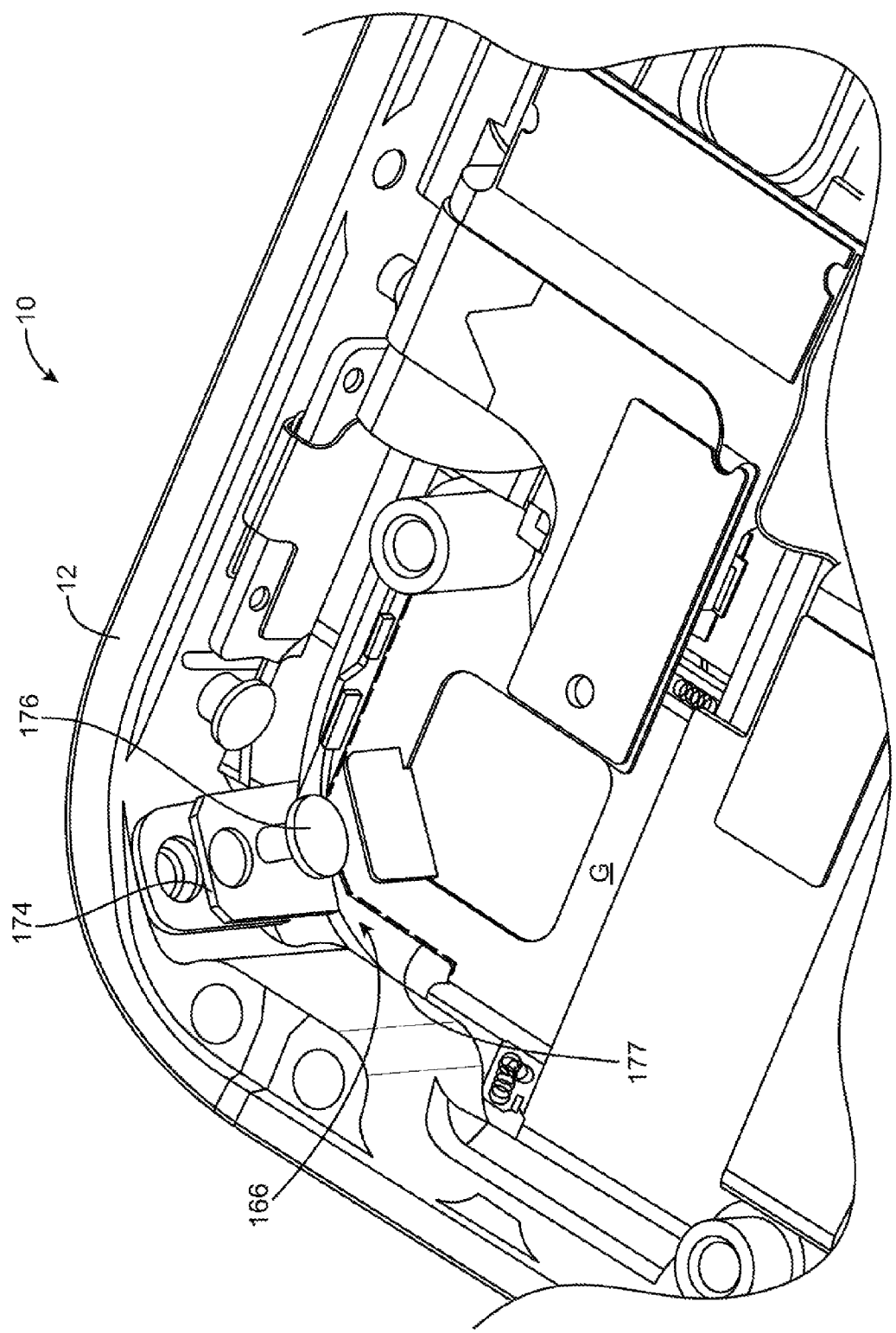
FIG. 9 is an exploded perspective view of the interior electronic device portion of FIG. 8 showing how the adjustable conductive structures may include a washer or other conductive member with a thickness that may be selected to make antenna adjustments in accordance with an embodiment of the present invention.
Figure 10:
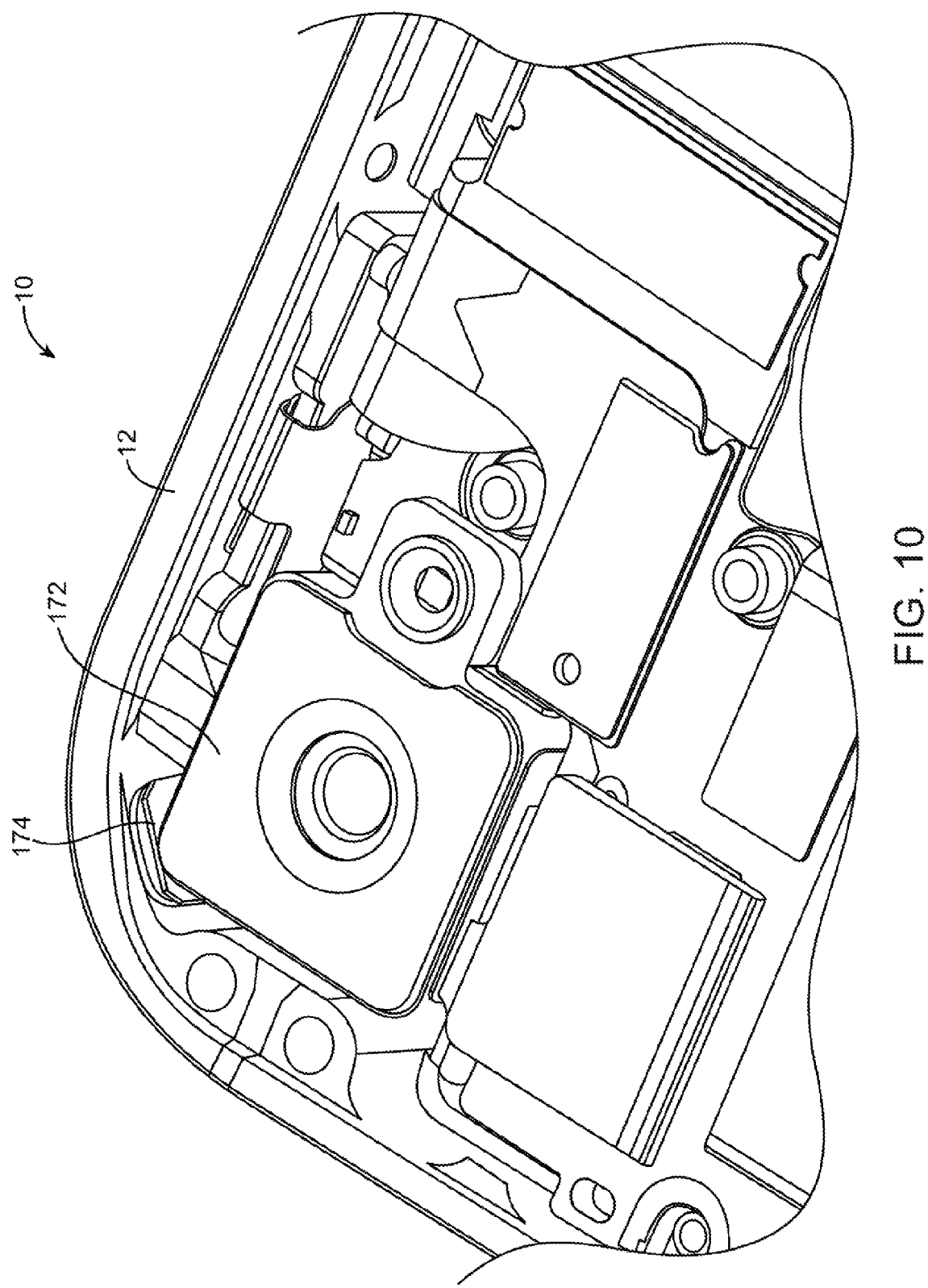
FIG. 10 is a perspective view of the interior of the electronic device of FIG. 9 showing how the adjustable conductive structures may oppose conductive device components across an antenna gap region in accordance with an embodiment of the present invention.

With one illustrative arrangement, adjustable structure 166 includes a washer or other suitable shim and a screw that are mounted to a threaded structure on peripheral conductive housing member 12. FIG. 9 is an exploded perspective view of device 10 showing how adjustable structure 166 may include screw 172 and metal washer 174. Dashed line 177 shows the edge of ground plane G in the vicinity of washer 174. A corresponding, assembled view is shown in FIG. 10.

The foregoing is merely illustrative of the principles of this mention and various modifications can be made by those skilled in the art without departing from the scope and spirit of the invention.

What is claimed is:

1. An electronic device, comprising:
   a housing having conductive structures that form an antenna ground for an antenna and having a peripheral conductive member that runs around at least some edges of the housing and forms at least part of the antenna, wherein the antenna ground and the peripheral conductive member are separated by a gap and wherein the conductive structures have protruding portions; and
   a plastic structure in the gap that is molded over the protruding portions of the conductive structures.

2. The electronic device defined in claim 1 wherein the peripheral conductive member comprises at least one recess and wherein the plastic structure is disposed within the at least one recess of the peripheral conductive member.

3. The electronic device defined in claim 1 wherein the peripheral conductive member comprises at least one recess that receives a mating edge portion of the plastic structure such that the plastic structure is secured in place relative to the peripheral conductive member.

4. The electronic device defined in claim 1 wherein the plastic structure provides a structural connection between an edge of the conductive structures and the peripheral conductive member.

5. The electronic device defined in claim 1 wherein the plastic structure provides a structural connection between an edge of the conductive structures and the peripheral conductive member without substantially the radio-frequency properties of the gap between the antenna ground and the peripheral conductive member.

6. The electronic device defined in claim 1 wherein the plastic structure provides a structural connection between a corner of the conductive structures and a corner of the peripheral conductive member.

7. The electronic device defined in claim 1 wherein the plastic structure provides a structural connection between an upper edge of the conductive structures and a portion of the peripheral conductive member that runs along an upper edge of the electronic device.

8. The electronic device defined in claim 1 wherein the plastic structure bridges the gap and contacts the peripheral conductive member, wherein the conductive structures comprise at least one internal sheet metal structure, and wherein the protruding portions comprises bent tabs.

9. The electronic device defined in claim 8 wherein the bent tabs have profiles that resist separation between the plastic structure and the conductive structures.

10. The electronic device defined in claim 1 wherein the housing has a rectangular periphery and wherein the peripheral conductive member comprises a metal housing member that forms sidewalls for the housing and that extends around the rectangular periphery.

11. An electronic device, comprising:
    a housing containing conductive structures that form an antenna ground for an antenna and having a peripheral conductive member that runs around at least some edges of the housing and forms at least part of the antenna, wherein the antenna ground and the peripheral conductive member are separated by a gap; and
    an adjustable conductive structure between the peripheral conductive member and the conductive structures, wherein the adjustable conductive structure is configured to tune the antenna by adjusting the gap.

12. The electronic device defined in claim 11, wherein the adjustable conductive structure is adjacent to a corner of the peripheral conductive member.

13. The electronic device defined in claim 11 wherein the adjustable conductive structure comprises a screw.

14. The electronic device defined in claim 11 wherein the adjustable conductive structure comprises a washer.

15. The electronic device defined in claim 11 wherein the adjustable conductive structure comprises a shim.

16. The electronic device defined in claim 11 wherein the adjustable conductive structure comprises a threaded structure.

17. The electronic device defined in claim 11 wherein the conductive structures that form the antenna ground comprise a camera.

18. The electronic device defined in claim 11 wherein the conductive structures that form the antenna ground include at least one layer of sheet metal.

19. The electronic device defined in claim 11 wherein the peripheral conductive member comprises a ring-shaped stainless steel member.

20. The electronic device defined in claim 11 further comprising plastic in the gap.

\* \* \* \* \*